United States Patent [11] 3,628,229

[72] Inventors John M. Biddison;
    Clarence W. Donnaker, both of Dayton, Ohio
[21] Appl. No. 812,258
[22] Filed Apr. 1, 1969
[45] Patented Dec. 21, 1971
[73] Assignee The Globe Tool and Engineering Company
    Dayton, Ohio

[54] AUTOMATIC ARMATURE WINDING MACHINE
    11 Claims, 11 Drawing Figs.
[52] U.S. Cl........................................ 29/205 C,
    29/596, 29/597, 140/92.1, 242/7.05 B
[51] Int. Cl......................................... H02k 15/00
[50] Field of Search............................29/205, 205
    C, 205 CO, 596, 597, 598, 605; 140/92.1, 92.2;
    242/7.05

[56] References Cited
    UNITED STATES PATENTS
2,779,886  1/1957  Hunsdorf................... 29/598 X
2,947,427  8/1960  Moore........................ 29/205 X
3,474,515  10/1969 Dammar..................... 29/205
3,524,601  8/1970  Biddison et al. ........... 29/605 X Primary Examiner—John F. Campbell
Assistant Examiner—Carl E. Hall
Attorney—Dybvig & Dybvig ABSTRACT: In the automatic winding of armatures, the last lead wire from a coil wound in an armature is looped about an appropriate commutator tang and the wire portion connected between the newly wound armature and an unwound armature is cut closely adjacent the aforementioned commutator tang. Also disclosed is a double-flier apparatus for winding armatures, wirecutting assemblies, and a transfer mechanism adapted to hold the connecting wire portions in a position where they may be cut closely adjacent the tangs about which the wires are looped. In one embodiment the commutator tangs are collapsed at the time the connecting wire portions are cut.

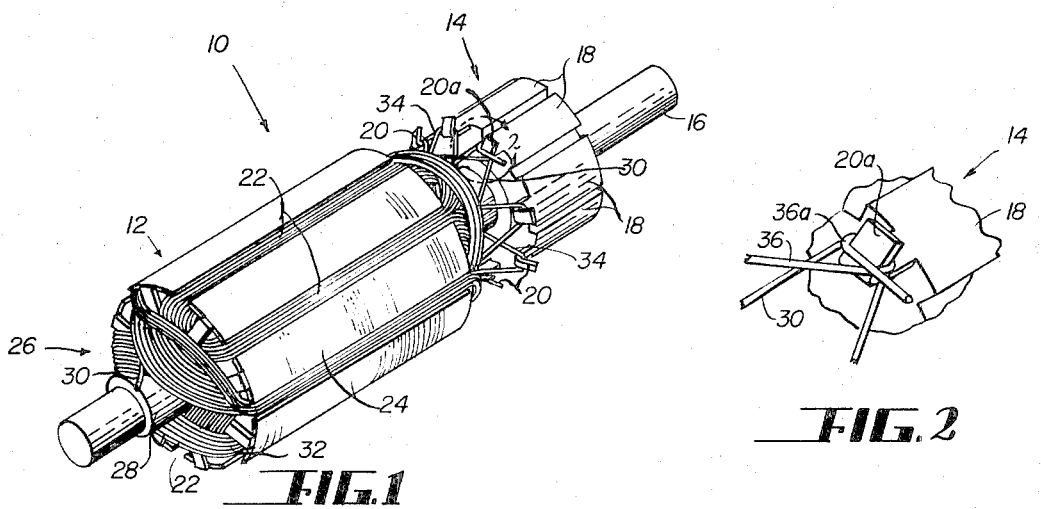
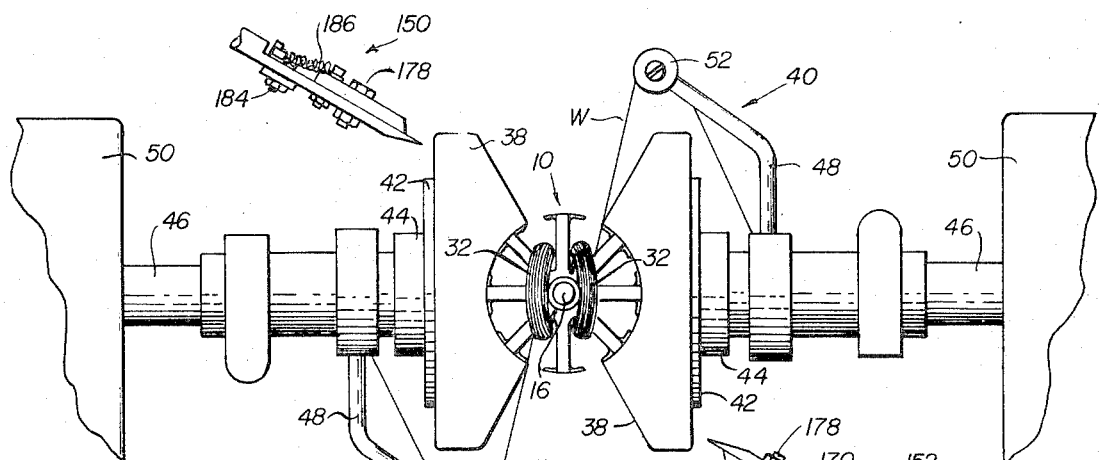
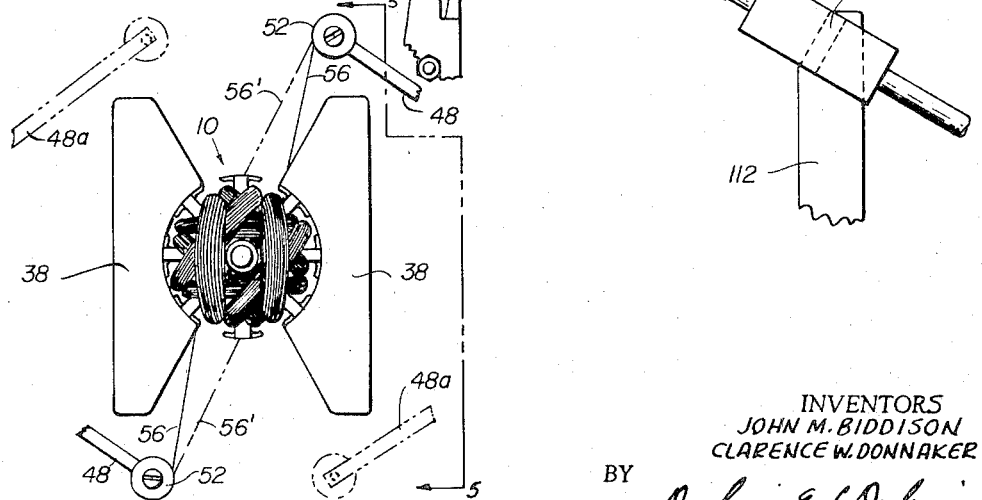
INVENTORS
JOHN M. BIDDISON
CLARENCE W. DONNAKER
BY
THEIR ATTORNEYS

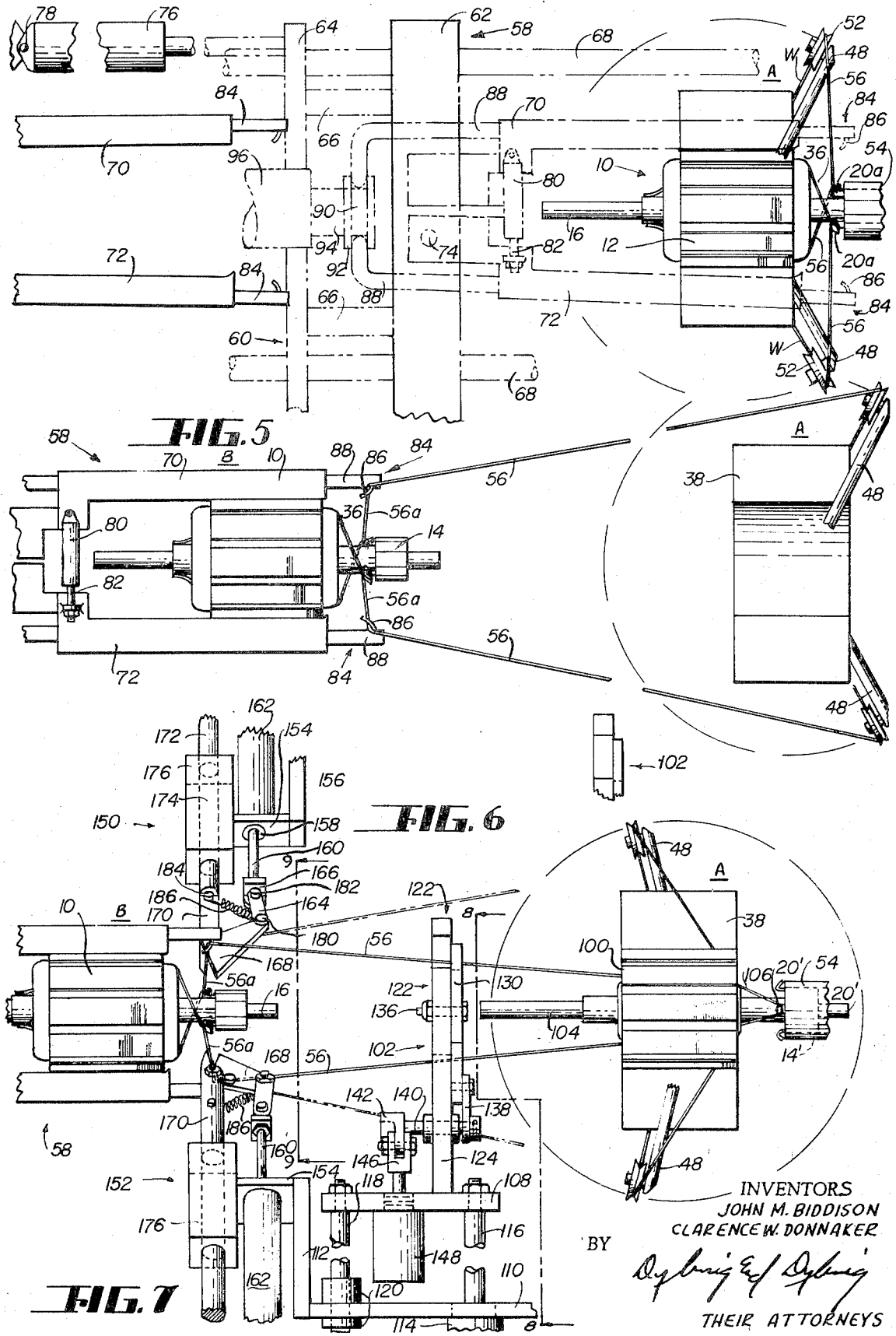

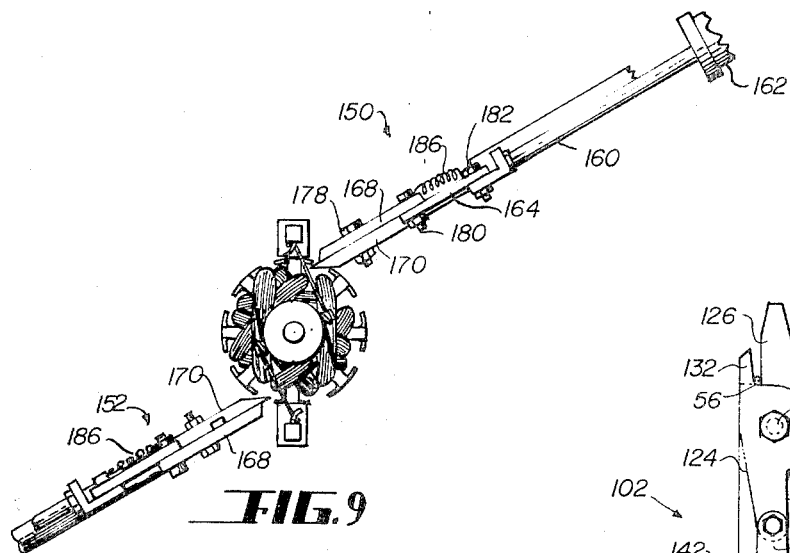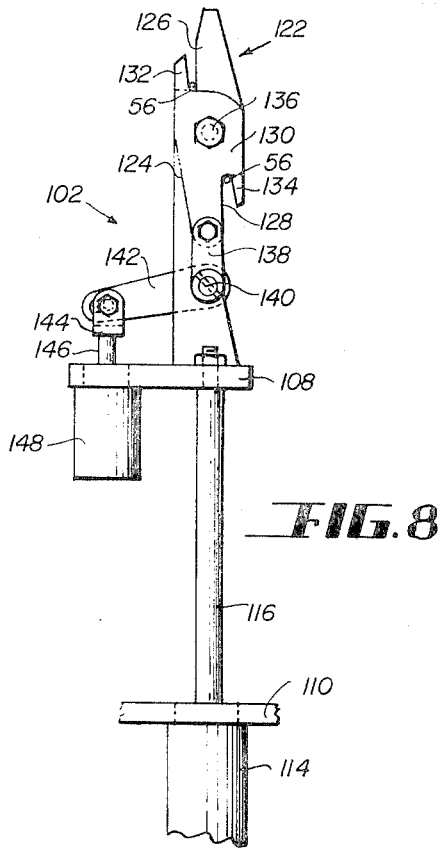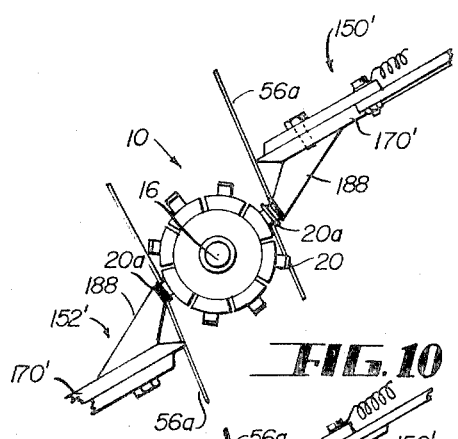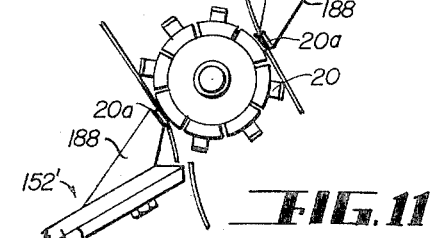

AUTOMATIC ARMATURE WINDING MACHINE

This invention relates to automatic armature winding and more particularly to a method and apparatus for cutting lengths of wire between successively wound armatures.

Fully automatic machines for winding armatures include mechanism for automatically loading an unwound armature at a winding station and mechanism for unloading the fully wound armature from the winding station. When winding armatures having commutators with tangs or hook, the lead wire connections to the commutator tangs are at least partially completed by the coursing of the lead wires over the tangs. When a wound armature is unloaded from the winding station of a double flier armature winding machine, the portions of wire leading from the last pair of lead wires to the fliers remain connected to the fully wound armature as an unwound armature is inserted in the winding station. During the winding of the unwound armature the aforementioned connecting wire portions between the armatures are normally cut. In accordance with present practice, these wire portions are cut in one place at this time and at some later stage in the handling of the wound armatures the ends of the wires, called "start wires," leading to one end of the armature and the ends of the wires, called "finish wires," leading from the other end of the armature are trimmed and parts of the finish wires permanently connected to the commutator. To temporarily hold the finish wires coursed about the appropriate commutator tangs, partial loops or coils are formed by the finish wires to hook them about the armature teeth, these partial loops or coils being removed when the finish wires are later trimmed.

In a copending application titled Automatic Armature Winding, filed by Otto F. Steinke in the U.S. Pat. Office on Aug. 1, 1968, Ser. No. 749,381, and assigned to the same assignee as this application, a method and apparatus are disclosed wherein the connecting wire portions between successively wound armatures are each simultaneously severed at two places. Thus, each connecting wire portion is severed closely adjacent the commutator of the wound armature and closely adjacent the opposite end of the armature shaft of the unwound armature as it is being wound. The finish wires of the wound armature are still partially coiled or looped about the armature so that they remain in place until later trimmed. The start wires for the armature being wound need no further manipulation or trimming. There are several advantages to the method and apparatus described in the aforementioned Steinke application. In part there is a considerable saving of the wasted wire which is cut away from the armatures and the subsequent handling of the wound armatures is simplified.

It is an object of this invention to further reduce the amount of wasted wire in the automatic winding of armatures and to further simplify the subsequent handling of automatically wound armatures. In accordance with this invention, the portions of wire connected between successively wound armatures may be cut closely adjacent the shaft of the unwound armatures as it is being wound in the manner suggested in the aforementioned application of Otto F. Steinke. The finish wires, rather than being coursed over the tangs and hooked about the armature teeth as normally done, are looped about the last tangs and cut closely adjacent to these tangs. As a result there is an additional saving in wasted wire because the finish wires are held by being looped about commutator tangs, Therefore, it is unnecessary to form a partial coil of wire from the finish wires which would later be cut away. Also no further trimming or cutting away of the finish wires is required.

It is a further object of this invention to provide a method and apparatus for engaging and retaining the wire portions connected between successively wound armatures in a path or position whereat they may conveniently be cut by automatically operating cutter mechanism. In accordance with this invention the wire engaging or retaining means is advantageously mounted on and associated with the transfer mechanism which unloads armatures from the winding station.

In some cases the wire used in winding armatures may be of such a character that the mere looping of the wire about a commutator tang will not be sufficient to retain it in place. Accordingly, it is a further object to provide mechanism for bending the tangs about which the finish wires are looped to clamp the finish wires thereto substantially simultaneously with the cutting of the finish wires.

Other objects and advantages will become apparent from the following description and the drawings in which:

FIG. 1 is a perspective view of an armature wound in accordance with this invention;

FIG. 2 is an enlarged perspective view of the portion of the wound armature of FIG. 1 enclosed within the circle 2—2 thereof;

FIG. 3 is a partial, simplified front elevational view of a double-flier armature-winding machine and illustrating portions of cutter assemblies incorporated therein. FIG. 3 also shows an armature with a pair of wound coils;

FIG. 4 is a front elevational view of a portion of the machine of FIG. 2 with a fully wound armature;

FIG. 5 is a simplified and partially schematic side elevational view showing a portion of the armature-winding machine, a fully wound armature with parts of the commutator and lead connections thereto omitted, an armature transfer mechanism and a wire-retaining mechanism;

FIG. 6 is a side elevational view similar to FIG. 5 and illustrating the wound armature moved from a winding station to a wirecutting station by the transfer mechanism. FIG. 6 also shows a portion of a cutter assembly;

FIG. 7 is a side elevational view similar to FIG. 6 with an unwound armature being wound at the winding station and with cutter assemblies advanced to cut the connecting wire portions between the wound and the unwound armatures;

FIG. 8 is a rear elevational view, as viewed in the direction of arrows 8—8 of FIG. 7 and illustrating the cutter assembly for cutting the connecting wire portions closely adjacent the shaft of the unwound armature;

FIG. 9 is a rear elevational view as viewed in the direction of the arrows 9—9 of FIG. 7 showing the wound armature and the cutter assemblies for cutting the finish wires closely adjacent the wound armatures;

FIG. 10 is a view similar to the center portion of FIG. 9 illustrating modified cutter assemblies. To minimize the confusion of lines, only the finish wires are shown for the armature of FIG. 10; and FIG. 11 is a view similar to FIG. 10 showing the modified cutter assemblies thereof severing the finish wires.

Referring to FIG. 1 in greater detail, an armature, generally designated 10, is illustrated of the type having a laminated core 12 and a commutator 14 mounted on an armature shaft 16. The commutator 14 has a plurality of circumferentially spaced commutator segments 18 terminating in hook-shaped tangs 20 adjacent one end of the laminated core 12. The core 12 has a plurality of radially extending slots 22 separated by T-shaped teeth 24 which receive a coil winding 26. As well known, armatures of this type have appropriate insulating members to prevent electrical contact between the winding 26 and the other parts of the armature 10 such as, for example, the insulating sleeve 28 received on the armature shaft 16 adjacent the core 12 opposite the commutator 14. When the armature 10 is assembled with the parts of a complete motor (not shown), portions of the armature shaft 16 projecting beyond the sleeve 28 and beyond the commutator 12 are journaled for rotation in motor bearings.

The basic winding pattern for the armature 10 illustrated in FIG. 1 is known in the art as an "automotive" pattern and is commonly used in a variety of applications in the automotive industry. This basic winding pattern, which is more fully described in U.S. Pat. No. 2,306,855, issued to Ernest C. Allen on Dec. 29, 1942, readily lends itself to automatic winding by the use of double-flier armature winding machines wherein pairs of coils are simultaneously wound by the two fliers with one-half the total number of coils wound being wound from a single length of wire and the other half being wound from another single length of wire.

FIG. 1 shows the cut end 30 of one of these two lengths of wire adjacent the armature shaft 16 opposite from the commutator 14. The cut end 30 is called a "start wire" and, of course, there are two such start wires, the other start wire being hidden by the shaft 16 in FIG. 1. At the start of the winding of the armature 10, the start wires 30 are laid into the bottom of a spaced pair of armature slots 22 and coursed about a pair of spaced tangs 20, one of which is designated 20a in FIGS. 1 and 2. The wires leading from the start wires 30 are then wound into coils, such as those designated 32 in FIG. 3, in pairs of spaced slots 22. After the winding of the first pair of coils 32 is completed, the wires are coursed over other spaced commutator tangs 20 to form wire commutator lead connections 34 and another pair of coils wound in different pairs of spaced slots 22. In a double-flier winding machine both of the lengths of wire forming the winding 26 are simultaneously wound to form coils and coursed over the tangs 20 between the coils until the last pair of coils forming the winding 26 is wound.

The present practice is to then course the "finish wires" extending from the last pair of coils about the same commutator tangs 20a which the start wires 30 are coursed over, and then through another pair of slots 22 so that the finish wires form a partial loop or coil and project adjacent and behind the commutator 14. In the automatic winding of successive armatures, the finish wires remain connected to the winding of the next armature to be wound until severed at some later time. The aforementioned application of Otto F. Steinke discloses a method and apparatus for cutting the partial loops or coils closely adjacent the commutators of wound armatures. Later in the handling of the wound armatures the portions of the finish wires partially looped through the slots 22 are cut away close to the end face of the commutator from which the tangs project.

In accordance with this invention, the finish wires, one of which is indicated at 36 in FIGS. 1 and 2, are not simply coursed over the commutator tangs 20a but rather are looped about the commutator tangs 20a and then, as the winding of the next armature is in progress, the finish wires 36 are cut closely adjacent the commutator tangs 20a. As a result, the wasted wire previously resulting from the partial looping or coiling of the finish wires through pairs of slots is saved and, further, the later trimming away of the wasted wire adjacent the commutator tangs 20a is unnecessary.

Depending upon the diameter and flexibility of the finish wires 36, the mere looping of the finish wires about the tangs 20a may be sufficient to lock the finish wires in place. With some types of wire, however, it may be necessary to clamp the looped finish wires 36 to the commutator tangs 20a. This can conveniently be done by bending or collapsing the tangs 20a upon themselves to clamp the finish wires 36 thereto. After an armature has been fully wound as illustrated in FIG. 1, it may be finished by staking the tangs 20 and 20a to the start wires 30 and finish wires 36 as well as all of the other lead connections 34. Also, as well known, the windings may be impregnated with suitable compounds and insulating wedges inserted into the tops of the slots 22. Because of this invention, no additional attention need be devoted to the finish wires.

Apparatus for winding the armature 10 and cutting the start and finish wires will now be described. Referring to FIGS. 3, 4 and 5, the armature 10 is shown supported between a pair of wire guide chucks or winding forms 38 of a double-flier armature winding machine, generally designated 40, the armature 10 being supported partly by the concavely curved surfaces of the chucks 38 and partly by a chuck assembly (not shown) clamped to the end of the armature shaft 16 adjacent the commutator 14. The wire guide wings 38 are mounted upon mounting plates 42 which have bearing housings 44 thereon that rotatably receive flier spindles 46 upon which are affixed fliers 48. The flier spindles 46 are rotatably received within drive housings 50 and are affixed in relation to the machine bed (not shown) upon which is mounted suitable drive mechanisms (not shown) by which the fliers 48 are rotated to simultaneously wind a pair of coils in the armature 10.

The pair of wires, designated W, forming the coils in the armature 10 are coursed through the flier spindles 46 and around wire guide pulleys 52 on the fliers 48. The wires W emanate from wire supplies (not shown) and are placed under tension at or near the wire supplies so that, as the fliers 48 rotate, the wires will be drawn from the wire supplied and guided between sloping surfaces of the wire guide chucks 38 to form a pair of coils. When the first armature to be wound is loaded in the winding machine 40 between the wire guide chucks 38, the free ends of the wires W are clamped or held in any suitable fashion. As will become apparent, the clamping of the wires for successively wound armatures is not required.

The fliers 48, when viewed from the front of the machine 40 as in FIG. 3, rotate in opposite directions when winding coils. For example, the right hand flier 48 of FIG. 3 may rotate in a "top going" direction. That is, the right-hand flier 48 rotates in such a manner that its pulley 52 would appear to be moving down through the plane of the drawing. The left-hand flier would then rotate in a "top coming" direction or opposite that of the right-hand flier. The machine 40 as thus far described may be entirely conventional and, accordingly, the complete construction and operation of the various mechanisms thereof, such as the drives for the chucks 38 and for the fliers 48, are not illustrated herein. Suitable drives for fully automatic double-flier armature winding machines are well known. A flier drive mechanism, for example, is shown in U.S. Pat. No. 3,371,483, issued to Robert C. Gray et al. on Mar. 5, 1968.

Those skilled in the art are aware that the commutator lead connections 34 between the wound coils can be accomplished in various ways. The aforementioned Allen U.S. Pat., No. 2,306,855, discloses the use of a fixed shield in a partially automatic armature winding machine which shields the commutator tangs during the winding of an armature but permits the wire to be hooked over preselected commutator tangs as the result of a combined movement of the rotating fliers and the indexing of the armature. We prefer a movable shield similar to the shield 40 shown in U.S. Pat. No. 3,231,206, granted to Harry W. Moore on Jan. 25, 1966, the movable shield being moved from tang shielding to unshielding positions between the winding of coils and the wire being hooked about selected commutator tangs either by movement of a wire-deflecting device or by rotation of the armature being wound and the fliers. Since the mechanisms by which the commutator lead connections between coils are formed are not important to this invention, they are not disclosed in detail herein. However, a portion of a movable tang shield, designated 54, for this purpose is illustrated in FIGS. 5 and 7.

After the winding of the last pair of coils, the finish wires 36 are looped about the tangs 20a as previously mentioned. For this purpose, the fliers 48 may be stopped in the positions thereof indicated by phantom lines 48a in FIG. 4 with the finish wires 36 closely adjacent the commutator tangs 20, the fliers 48 then being rotated in a reverse direction opposite to that they are rotated when winding coils, and when forming the lead wires 34 between coils, as the tang shield 54 is removed. This movement of the fliers 48 serves to course the finish wires 36 about the tangs 20a in a direction opposite to the direction in which the start wires 30 and lead wires 34 are coursed about the tangs 20a. This can best be understood by reference to FIG. 2. The shield 54 is then moved to its tang shielding position. At this time the fliers 48 are positioned as illustrated in full lines in FIG. 4 as well as in FIGS. 5 and 6, the fliers 48 being reversed through approximately 120° or less. The finish wires 36 can then be completely looped about the tangs 20a by rotating or indexing the armature 10 through several degrees in the same direction it is indexed during the armature winding cycle. This causes a portion, designated 36a in FIG. 2, of the finish wire 36 to be twisted about the surface of the tang 20a confronting the adjacent surface of the armature core 12. Projecting beyond this portion 36a of the finish wire 36 to the flier pulleys 52 are lengths of the wires W, designated 56 in FIG. 4, which ultimately will become connecting wire portions that connect the wound armature 10 to a subsequent armature to be wound as will be described below. The lastmentioned index of the armature 10 causes the connecting wire portions 56 to move from the full-line position thereof shown in FIG. 4 to the phantom line position designated 56' in FIG. 4.

The winding of the armature 10 and all of the connections from the coils to the commutator tangs 20 and 20a are completed when the armature 10 is held between the chucks 38 at a position which, for convenience, is referred to herein as the winding station A. With the fliers 48 temporarily held stationary, the wound armature 10 can now be transferred from the winding station A to an idle or wire cutting station designated B in FIGS. 6 and 7.

After the armature 10 is fully wound it is transferred from the winding station A to the wirecutting station B by transfer mechanism such as that generally designated 58 in FIGS. 5, 6 and 7. As schematically illustrated in FIG. 5, the transfer mechanism 58 may include a carriage 60 having a pair of carriage plates 62 and 64 interconnected by braces 66 slidably mounted upon a pair of guide rods 68 that are fixed relative to the bed of the machine. Mounted on the carriage plate 62 is an armature clamp device comprising a fixed clamp arm 70 and a pivotal clamp arm 72, the latter arm being pivotally connected to the carriage plate 62 as by a pivot pin 74. The two clamp arms 70 and 72 are substantially diametrically opposed with respect to the longitudinal axis of the armature 10, when located at the winding station A, and the carriage 60 is movable between the winding station A and the wirecutting station B along an axis coaxial or parallel to the longitudinal axis of the armature 10. The carriage 60 may be so moved by an air actuator 76 connected, as indicated at 78, to a fixed part of the machine.

Connected between the fixed clamp arm 70 and the movable clamp arm 72 is a clamping air actuator 80. When the carriage 60 has been advanced toward the winding station A by the air actuator 76, the piston 82 of the air actuator 80 is retracted, thereby raising the movable clamp arm 72 into engagement with the wound armature 10 whereupon it is clamped between the two clamp arms 70 and 72. FIG. 5 illustrates the clamp arms 70 and 72 in phantom lines just prior to clamping the armature 10 at the winding station A. The air actuator 76 is then energized to return the carriage 60 to the left as viewed in FIG. 5 to thereby position the armature 10 at the winding station B, as shown in FIG. 6, the armature 10 then being held solely by the clamp arms 70 and 72.

Simultaneously with the transfer of the wound armature 10 from the winding station A to the wirecutting station B, the connecting wire portions 56 adjacent the commutator 14 are engaged by wire-retaining devices 84 for holding short lengths thereof, designated 56a, outwardly from the commutator 14 in a plane which is nearly perpendicular to the longitudinal axis of the armature 10. The wire-retaining devices 84 hold the short lengths of wire 56a relative to the commutator tangs 20 in substantially the same position these lengths of wire occupy when the wound armature 10 is at the winding station A and the fliers 48 positioned as illustrated in full lines in FIG. 4 and in FIG. 5. Accordingly, there is no tendency for the finish wires to unravel from the tangs 20a and the short lengths of wire 56a are held in a convenient position at the wirecutting station B to be severed by cutting mechanisms which will be described below.

The wire-retaining devices 84 include wire-engaging hooks 86 mounted on the ends of elongate rods 88 that are rectangular in cross section and are slidably received within rectangular, longitudinally extending bores in the clamp arms 70 and 72 from which the rods 88 derive support. The ends of the rods 88 farthest from the winding station A are bent toward one another and received within a peripheral groove 90 of a disc 92 mounted on the end of a piston 94 of an air actuator 96, the elements 90, 92, 94 and 96 being shown in phantom lines in FIG. 5. The air actuator 96 is affixed to the carriage plate 64 and, accordingly, movable therewith. In operation the rods 88 are, as illustrated in FIG. 6, normally located relative to the clamp arms 70 and 72 with the hooks 86 projecting forwardly therefrom in the position illustrated in FIG. 6. When the carriage 60 is advanced toward the winding station A, the air actuator 96 and, accordingly, the rods 88 are carried therewith. After approaching the winding station A, the air actuator 96 is energized to extend its piston 94 whereupon the hooks 86 are projected forwardly from the adjacent ends of the clamp arms 70 and 72 beyond the wire portions 56 projected between the commutator tangs 20a and the flier pulleys 52 at the winding station A. Immediately thereafter the air actuator 96 is energized to retract its piston 94 whereupon the hooks 86 which cammed past the wire portions 56 now trap the wire portions 56 against the rods 88. When the carriage 60 is subsequently retracted from the winding station A to transfer the wound armature 10 to the wirecutting station B, the piston 94 remains retracted and the short lengths of wire 56a are retained as illustrated in FIG. 6. It will be observed that the pivotal movement of the lower clamp arm 72 does not interfere with the operation of the lower wire-retaining member 84 because the trailing end of the lower rod 88 can pivot within the groove 90.

After the wound armature 10 has been transferred to the wire cutting station B as described above, an unwound armature 100 (FIG. 7) is moved into the winding station A between the chucks 38 and a cutter assembly, generally designated 102, is positioned between the armatures 10 and 100. The fliers 48 and the shield 54 are then appropriately moved to hook parts 106 of the wires W over selected commutator tangs 20' of the unwound armature 100 and the fliers 48 rotated to commence the winding of coils in the unwound armature 100. Depending upon the winding pattern used, the armature may be first indexed by mechanism (not shown) forming part of the armature winding machine 40. In any event, the tightly wound coils of wire effectively clamp themselves to the armature 100 whereupon the connecting wire portions 57 between the wound armature 10 and the armature 100, which is now being wound, can safely be cut away after a few turns or coils of wire have been wound.

Referring to FIGS. 7 and 8, the cutter assembly 102 is designed to cut the connecting wire portions 56 immediately adjacent the end of the shaft 104 of the unwound armature 100 opposite from its commutator 14' and includes a cutter support plate 108 mounted for vertical movement with respect to a bracket 110 mounted on a plate 112 or the like which is fixed with respect to the bed of the machine. Mounted on the bracket 110 is a vertically mounted fluid operated cutter positioning cylinder 114 having an upwardly projecting piston rod 116 connected to the cutter support plate 108. A vertically extending guide rod 118 connected to the support plate 108 passes through bushings 120 and an aperture in the fixed bracket 110 in parallel relation to the piston rod 116. The entire cutter assembly 12 is movable from a lower position, as indicated by the part thereof shown in FIG. 6, to an upper position, as shown in FIG. 7, by operation of the cutter positioning cylinder 114, the cutter assembly 102 being guided in this movement by the guide rod 118. Suitable stops (not shown) associated with the cutter assembly 102 or with the piston rod 116 may be used to accurately determine the extreme upper and lower positions of the cutter assembly 102.

Mounted on top of the cutter support plate 108 is a double-cutter mechanism, generally designated 122, which includes a narrow upwardly extending fixed cutter plate 124 mounted on the cutter support plate 108 having, as viewed in FIG. 8, an upper, left side, vertically extending cutting edge 126 and a lower, right side, vertically extending cutting edge 128. Cooperating with the fixed cutter plate 124 is a double-edge knife blade 130 having left and right, upper and lower, vertically extending cutting edges 132 and 134, respectively, the knife blade 130 being mounted for rotation about a horizontal axis on the fixed cutting plate 124 by a pivot pin 136. Pivotally connected to the bottom of the knife blade 130 is a drive link 138 which is affixed to one end of a cutter drive rod 140 journaled for rotation in a bore in the fixed cutter plate 124. The cutter drive rod 140 is affixed to a drive link 142 which in turn is pivotally mounted upon a fixture 144 fixed to the piston rod 146 of a fluid-operated cutter drive cylinder 148 mounted on the cutter support plate 108.

In operation, the cutter assembly 102 is so positioned with respect to the wire portions 56 before the fliers 48 are rotated to wind coils in the unwound armature 100 that, as the fliers 48 begin to rotate, the connecting wire portions 56 are drawn toward the cutter assembly 102 and between the upper cutting edges 126 and 132 and the lower cutting edges 128 and 134. Thereafter when it is desired to cut the wire portions 56 closely adjacent the unwound armature 100, the cutter drive cylinder 148 is energized to retract its piston 146 causing the double-edged knife blade 130 to rotate in a clockwise direction (as viewed in FIG. 8) whereupon the parts of the connecting wire portions 56 trapped between the aforementioned cutting edges are severed. Conventional machine controls are used to cause the operation of the cylinders 114 and 148 in timed relation to the operation of the fliers 48 as well as the transfer mechanism 58 described above. Also, the same conventional machine controls are used to cause the wire portions 56 to be severed closely adjacent to the tangs 20a of the wound armature 10 as will be described below. None of the machine timing controls have been illustrated herein, such devices being old and well known.

The wire portions 56a are cut closely adjacent the commutator tangs 20a of the wound armature 10 by a pair of cutter assemblies 150 and 152 which are illustrated in FIGS. 3, 7 and 9. Referring to FIG. 7, the cutter assembly 150 includes a support plate or bracket 154 mounted on a plate 156 or the like which is fixed in relation to the bed of the machine. Extending through a bore 158 in the bracket 154 is a piston rod 160 of a cutter drive air actuator 162 affixed to the bracket 154. Mounted on the free end of a link 164 attached by a fitting 166 to the free end of the piston rod 160 is a pivotal cutter blade 168 having a forward cutting edge which cooperates with the cutting edge of a relatively fixed cutting blade 170 mounted on a guide rod or shaft 172 which projects through a bore 174 in a guide block 176 which in turn is mounted on the support bracket 154. Referring also to FIG. 9, the pivotal cutter blade 168 is generally triangular with one corner being pivotally connected as by a volt 178 to the fixed cutter blade 170 and by a pivot pin 180 to the link 164 which in turn is pivotally mounted by a pivot pin 182 to the fitting 166. Connected between the pivot pin 180 and a lug 184 on the fixed cutter blade 170 is a relatively strong coil spring 186.

It should be apparent from the foregoing that, when the air actuator 162 is energized to move the piston rod 160 toward the armature 10 at the winding station B, the pivotal cutter blade 168 and fixed cutter blade 170 initially move together, the parts being guided by the confinement of the guide rod 172 within the bore 174. When the relatively fixed cutter blade 170 is located approximately in the position shown in FIG. 7, a stop (not shown) coacting between the guide rod 172 and the guide block 176 prevents further linear movement of the parts of the cutter mechanism toward the armature shaft 16. At this time the bias of the coil spring 186 is overcome whereupon the pivotal cutter blade 168 pivots about the axis of the bolt 178 whereupon the short length of wire 56a, which now is trapped between the blades 168 and 170, is cut with a scissorslike action. The construction and operation of the cutter assembly 152 may be identical to that of the cutter assembly 150 and the corresponding parts thereof have been given corresponding reference characters. For purposes of illustration the cutter assembly 152 is shown affixed to the same plate 112 which serves as a mounting for the cutter assembly 102. Those skilled in the art will recognize that, aside from their location and function, the cutter assemblies 150 and 152 may be entirely conventional and a variety of cutter mechanisms are commercially available which would suit the purposes of this invention.

The severed ends of the finish wires looped about the tangs 20a in practice can be cut sufficiently close to the tangs 20a that no further cutting or trimming of these cut ends is necessary. In subsequent hot staking or similar operations, the tangs 20a require no special attention and can be treated identically to the other tangs 20. Because the start wires are brought down close to the armature shaft away from the bearing area thereof, they also require no further attention. Thus, when a wound armature 10 is moved from the wirecutting station B, the windings are complete and no further handling of the wires forming the windings is required. The removal of the wound armature 10 from the wirecutting station B is not described herein since this can be accomplished in many ways, as well known. In usual operation, each successively wound armature will be first moved from the winding station A to station B and then to a hot staking station (not shown) for more permanently attaching the lead wires to the tangs. It will be observed that a minimum length of wasted wire between successively wound armatures is cut away. In mass production the reduction of the amount of wasted wire is quite significant. For example, this invention may save enough wire to wind several additional armatures each day.

FIGS. 10 and 11 show slightly modified cutter assemblies designated 150' and 152' used to cut the short lengths of wire 56a close to the commutator tangs 20a. The twisting of the finish wires about the tangs 20a may not be sufficient in some cases to prevent these finish wires from unraveling after they are cut. As previously suggested, unraveling of the finish wires can be prevented by bending or collapsing the tangs 20a, thereby clamping the wire looped about thereto. This can conveniently be accomplished by means of hammer members 188 mounted on or integral with the relatively fixed cutter blades 170' as shown in FIGS. 10 and 11. As the cutter assemblies 150' and 152' are advanced toward the armature shaft 16, the hammer members 188 engage the free ends of the tangs 20a, collapsing these free ends upon the fixed ends of the tangs 20a to firmly clamp the finish wires. This operation can be best understood by reference to FIG. 10 in which the hammer members 188 are just beginning to engage the free ends of the tangs 20a and FIG. 11 in which the tangs 20a have been collapsed and the wire portions 56a severed. In both FIGS. 10 and 11 the size of the hammer members 188 have been exaggerated as well as the length of the severed end of the wire portions 56a looped about the tangs 20a for purposes of better showing the operation thereof.

We claim:

1. In an armature winding machine of the type having a pair of rotating fliers and a pair of winding forms for directing wires into pairs of slots in an armature core mounted on an armature shaft and supported between said pair of fliers, of the type wherein leads are automatically made to commutator tangs of a commutator mounted on said shaft adjacent said core during the winding of an armature, and of the type wherein a wound armature is removed from its position between the fliers with two lengths of wire leading from a pair of commutator tangs of the wound armature to the fliers, an unwound armature being then supported between the fliers for the winding of coils in said unwound armature, apparatus for cutting the lengths of connecting wires between said wound armature and said unwound armature including means engaging the connecting wires between said wound armature and said unwound armature for holding the sections of said connecting wires adjacent the commutator of said wound armature in planes nearly perpendicularly intersecting said shaft, and wire cutting means for cutting said ends of said connecting wires immediately adjacent said commutator.

2. The machine of claim 1 wherein the last pair of commutator lead connections is made by looping said wires about a pair of commutator tangs, and further including means for bending said pair of commutator tangs to clamp the wires thereto.

3. The machine of claim 1 wherein said wirecutting means includes a pair of wire cutting assemblies, one for each of said connecting wires, each of said wirecutting assemblies including cutter blades movable toward and away from said ends of said connecting wires, and means for advancing said cutter blades into wirecutting positions.

4. The machine of claim 3 wherein the last pair of commutator lead connections is made by looping said wires about a pair of commutator tangs, and further including means for bending said pair of commutator tangs to clamp the wires thereto.

5. The machine of claim 4 wherein said means for bending said pair of commutator tangs is carried by one of said cutter blades of each of said wirecutting assemblies.

6. In an armature winding machine of the type having a pair of rotating fliers and a pair of winding forms for directing wires into pairs of slots in an armature core supported between said pair of fliers, of the type wherein commutator lead connections are automatically formed in the winding of an armature, and of the type including transfer means for removing a wound armature from its position between the fliers with two lengths of wire leading from a pair of commutator tangs of the wound armature to the fliers, an unwound armature being then supported between the pair of fliers for the winding of coils in said unwound armature, the improvement wherein said transfer means comprises clamp means for gripping a wound armature and wire-engaging means carried by said clamp means for engaging said two lengths of wire leading from said pair of commutator tangs of the wound armature to the fliers and holding said two lengths of wire so that portions thereof extend outwardly from the shaft of said wound armature, and wirecutting means for cutting said portions of wire immediately adjacent the commutator tangs of said wound armature.

7. The machine of claim 6 wherein the last pair of commutator lead connections is made by looping said wires about a pair of commutator tangs, and further including means for bending said pair of commutator tangs to clamp the wires thereto.

8. The machine of claim 6 wherein said wirecutting means includes a pair of wirecutting assemblies, one for each of said connecting wires, each of said wirecutting assemblies including cutter blades movable toward and away from said portions of wire, and means for advancing said cutter blades into a wirecutting position.

9. The machine of claim 8 wherein one of said cutter blades of each of said wirecutting assemblies has means thereon for engaging and bending the commutator tangs of said wound armature to which said connecting wires are connected.

10. A machine for automatically winding armatures of the type wherein at least one rotating flier is rotated to wind coils of wire guided by a wire guide into slots of an armature core mounted on an armature shaft and supported adjacent said flier and of the type wherein lead connections are made to commutator tangs of a commutator mounted on said shaft adjacent said core by relative movements of the flier and the armature being wound, the improvement wherein said machine is provided with automatically operated wire cutter means adapted to cut the section of wire leading from the last commutator tang to which the wire is connected at the end of the winding of an armature, said wire cutter means being operable to cut said section of wire immediately adjacent said last-mentioned tang and sufficiently close to said last-mentioned tang that no further trimming of wire therefrom is required, wire-engaging means operatively associated with said wire cutter means for retaining said section of wire in a plane nearly perpendicularly intersecting said armature shaft at the end of the winding of an armature and prior to the operation of said cutter means, said wire engaging means engaging said wire at a point remote from said armature shaft and retaining said wire in said plane and in the path of operation of said wire cutter means, and automatically operated means for moving said wire-engaging means into engagement with said wire.

11. The machine of claim 10 wherein said improvement further includes transfer means including a clamp for gripping the wound armature and operative to remove the wound armature from its position adjacent said flier after the winding of the wound armature is completed, and wherein said wire-engaging means is mounted upon said transfer means for movement therewith.

* * * * *